US009219804B2

(12) United States Patent
Sarin et al.

(10) Patent No.: US 9,219,804 B2
(45) Date of Patent: *Dec. 22, 2015

(54) AUTOMATIC ANSWERING OF A MOBILE PHONE

(71) Applicant: Microsoft Corporation, Redmond, WA (US)

(72) Inventors: Raman Kumar Sarin, Redmond, WA (US); Monica Estela Gonzalez Veron, Seattle, WA (US); Kenneth Paul Hinckley, Redmond, WA (US); Sumit Kumar, Bellevue, WA (US); James Kai Yu Lau, Bellevue, WA (US); Joseph H. Matthews, III, Woodinville, WA (US); Jae Pum Park, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/962,854

(22) Filed: Aug. 8, 2013

(65) Prior Publication Data

US 2013/0324194 A1 Dec. 5, 2013

Related U.S. Application Data

(63) Continuation of application No. 13/031,076, filed on Feb. 18, 2011, now Pat. No. 8,509,842.

(51) Int. Cl.
*H04M 1/00* (2006.01)
*H04M 1/02* (2006.01)
*H04M 1/725* (2006.01)

(52) U.S. Cl.
CPC ........ *H04M 1/0202* (2013.01); *H04M 1/72519* (2013.01); *H04M 2250/12* (2013.01); *H04M 2250/22* (2013.01)

(58) Field of Classification Search
CPC ............ H04M 1/72519; H04M 2250/12; H04M 2250/22
USPC ........ 455/566, 550.1, 567, 401, 575.3, 575.4, 455/575.6; 715/862–864
See application file for complete search history.

(56) References Cited

U.S. PATENT DOCUMENTS 7,289,102 B2 10/2007 Hinckley et al.
7,302,280 B2 11/2007 Hinckley et al.
(Continued)

FOREIGN PATENT DOCUMENTS

CN 101471983 A 7/2009
CN 101610307 A 12/2009
(Continued)

OTHER PUBLICATIONS

Baldauf et al., Supporting Hand Gesture Manipulation of Projected Content with Mobile Phones, *Proceedings of the Workshop on Mobile Interaction with the Real* World, Sep. 2009, 4 pages.
(Continued)

*Primary Examiner* — Wayne Cai
(74) *Attorney, Agent, or Firm* — Bryan Webster; Judy Yee; Micky Minhas

(57) ABSTRACT

The present disclosure relates to a mobile phone and a method for answering such a phone automatically without user input. In one embodiment, the mobile phone detects that a call is being received. A proximity sensor is then used to detect the presence of a nearby object. For example, this allows a determination to be made whether the mobile phone is within a pocket of the user while the phone is ringing. Then a determination is made whether the proximity sensor changes states. For example, if a user removes the phone from their pocket, the proximity sensor switches from detecting something proximal to detecting that the phone is no longer in the user's pocket. Next, a determination is made whether the proximity sensor is again next to an object, such as an ear. If so, the mobile phone can be automatically answered without further user input.

20 Claims, 5 Drawing Sheets

(56) References Cited

U.S. PATENT DOCUMENTS

| | | |
|---|---|---|
| 2005/0210417 A1 | 9/2005 | Marvit et al. |
| 2008/0163130 A1 | 7/2008 | Westerman |
| 2008/0165255 A1 | 7/2008 | Christie et al. |
| 2008/0256494 A1 | 10/2008 | Greenfield |
| 2009/0262078 A1 | 10/2009 | Pizzi |
| 2010/0080084 A1 | 4/2010 | Chen et al. |
| 2011/0080365 A1* | 4/2011 | Westerman ............ 345/173 |
| 2011/0223974 A1 | 9/2011 | Agevik et al. |
| 2011/0273378 A1* | 11/2011 | Alameh et al. ............ 345/173 |

FOREIGN PATENT DOCUMENTS

| | | |
|---|---|---|
| CN | 101471994 A | 7/2010 |
| CN | 101854430 A | 10/2010 |
| CN | 101964844 A | 2/2011 |
| WO | WO2010/128796 | 11/2010 |

OTHER PUBLICATIONS

Niezen et al., "Gesture recognition as ubiquitous input for mobile phones," *UBiComp '08 Workshop Wi—Devices that Alter Perception*, Sep. 2008, 5 pages.

Kratz et al., "Gesture Recognition Using Motion Estimation on Mobile Phones," *3$^{rd}$ International Workshop on Pervasive Mobile Interaction Devices at Pervasive 2007*, May 2007, 5 pages.

Tsukada et al., "Ubi-Finger: Gesture Input Device for Mobile Use," *Proceedings of APCHI 2002*, 2002, 8 pages.

\* cited by examiner

AUTOMATIC ANSWERING OF A MOBILE PHONE

CROSS REFERENCE TO RELATED APPLICATION

This is a continuation of U.S. patent application Ser. No. 13/031,076, filed Feb. 18, 2011, which application is incorporated herein by reference in its entirety

FIELD

The present application relates to mobile devices, and, particularly, to mobile phones that automatically react to a user's actions.

BACKGROUND

Mobile phones are the most ubiquitous mobile computers available. The latest versions contain sensors, such as accelerometers, and actuators that create vibro-tactile feedback. Manufacturers of mobile phones are searching for solutions to make mobile phone use more efficient and easier for users.

One example is a mobile phone that detects movement of the phone towards a user's ear using a posture detecting sensor, such as disclosed in WO2010/12876. In that application, an ambient light sensor is used in conjunction with an acceleration sensor to sense whether a user wants to answer the phone. If conditions are correct, the call is answered automatically. Unfortunately, ambient light sensors perform poorly in low-light conditions. Additionally, the acceleration sensor could lead to inaccurate results when used for position information.

Accordingly, it is desirable to provide a more accurate posture sensing device to accurately take actions based on the posture of a user.

SUMMARY

The present disclosure relates to a mobile phone and a method for answering such a phone automatically without user input.

In one embodiment, the mobile phone detects that a call is being received. The proximity sensor is then used to detect the presence of a nearby object. For example, this allows a determination to be made whether the mobile phone is within a pocket of the user while the phone is ringing. Then a determination is made whether the proximity sensor changes states. For example, if a user pulls the phone out of their pocket, the proximity sensor switches from detecting something proximal to detecting that the phone is no longer in the user's pocket. Next, a determination is made whether the proximity sensor is again next to an object, such as an ear. If so, the mobile phone can be automatically answered without further user input.

In another embodiment, a pitch and roll detector can be used to determine the general orientation of the phone. Certain values for pitch and roll indicate that the phone is adjacent the user's ear. In such a case, automatic answer can be effectuated.

In yet another embodiment, capacitive sensing can be used to detect that the phone is within the user's hand. For example, the capacitive sensing can be coupled to an outer casing of the phone and if the user touches the outer casing, such as holding the phone to answer it, the automatic answering can be used.

The foregoing and other objects, features, and advantages of the invention will become more apparent from the following detailed description, which proceeds with reference to the accompanying figures.

DETAILED DESCRIPTION

Figure 1:
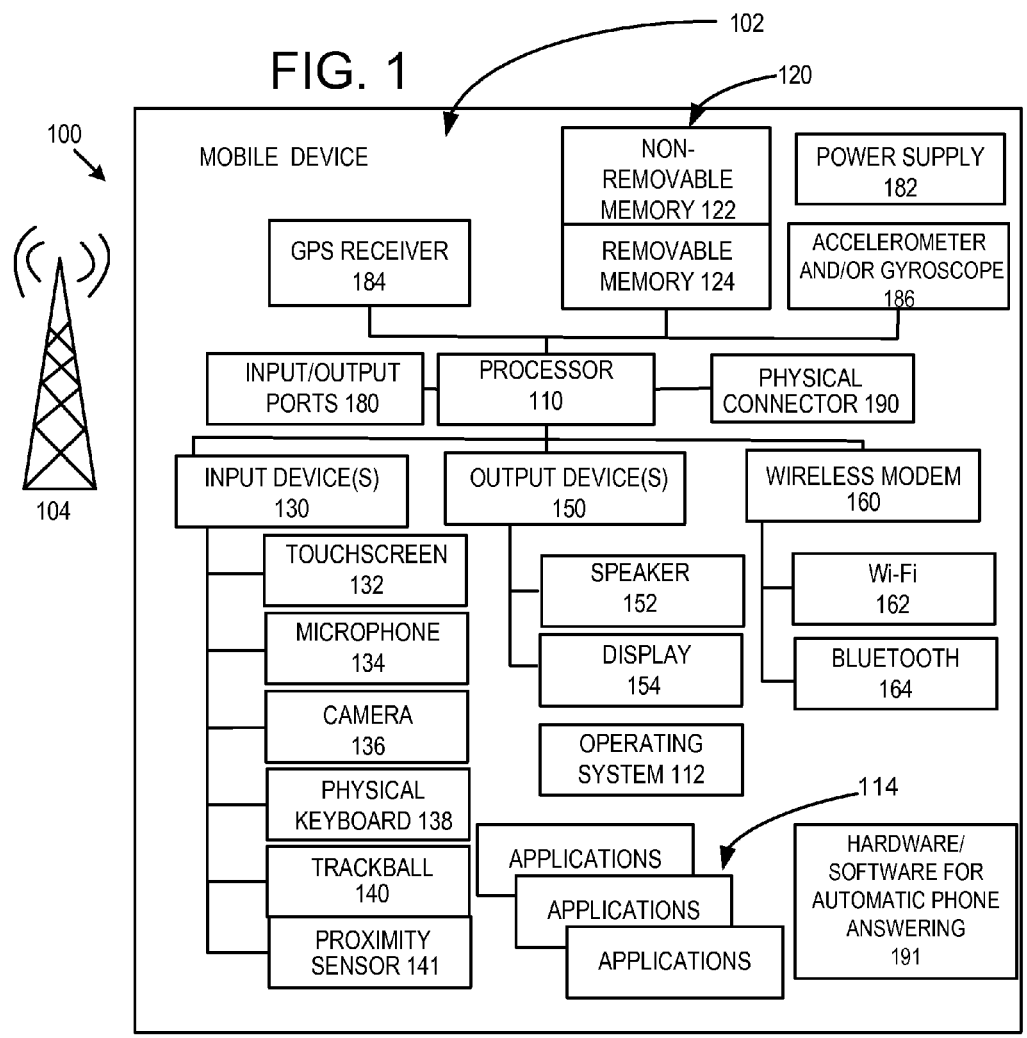
FIG. 1 is an example mobile phone that can be used for automatic answering.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), USB handset, etc.) and can allow wireless two-way communications with one or more mobile communications networks 104, such as a cellular or satellite network.

The illustrated mobile device 100 can include one or more controllers or processors 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touch screen 132, microphone 134, camera 136, physical keyboard 138, trackball 140, and/or proximity sensor 141 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device. Additionally, other input devices (e.g., a joystick) or output devices can be used.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth or Wi-Fi). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer and/or gyroscope 186, and/or a physical connector 190, which can be a USB port, IEEE 1394 (FireWire) port, and/or RS-232 port. Additional hardware or software 191 can also be included for automatic answering of a call. The illustrated components 102 are not required or all-inclusive, as any components can deleted and other components can be added.

Figure 2:
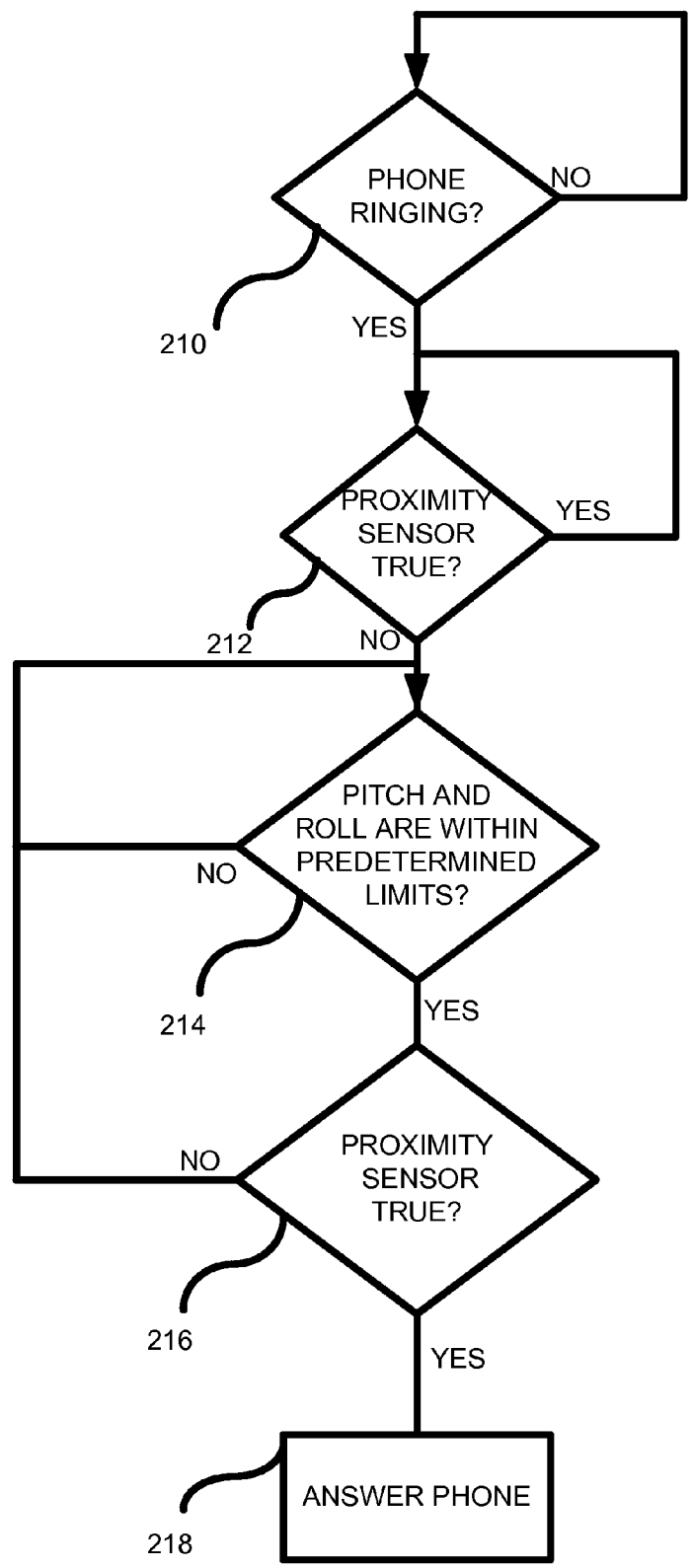
FIG. 2 is a flowchart of a method for detecting that the mobile phone is adjacent the user's ear so that the phone can be automatically answered.

FIG. 2 shows an embodiment of a method for implementing the automated answering of a mobile phone. In decision block 210, an incoming phone call is detected as being received. Such detection is standard in mobile phones as a message is typically displayed to the user indicating the incoming phone number or identification of the person calling. The detection is illustrated and described herein generically as "phone ringing." If the phone is not ringing, the method loops on decision block 210. If the phone is ringing, in decision block 212, a proximity sensor is checked to determine if the proximity sensor is true. When the proximity sensor is true it indicates detection of an object in close proximity. Close proximity means that the proximity sensor is within a predetermined distance from an object. Example predetermined distances could be one or two inches or less, but any distance can be chosen based on the particular design. One particular application has the proximity sensor set to detect when the mobile phone is in a pocket or a handbag with objects about a ¼ inch away or less. Additionally, the proximity sensor can be set to detect when the phone is placed on a user's ear. Thus, in decision block 212, if the proximity sensor is true then the phone is assumed ringing while positioned in a user's pocket or handbag. If the proximity sensor remains true, then the method loops on decision block 212 until the proximity sensor switches to a false state. When the proximity sensor switches to a false state, it is assumed that the mobile phone has been removed from the user's pocket or handbag and is proceeding towards the user's ear. In such a state, the proximity sensor switches to a false state because the phone is not within the predetermined distance from an object. An additional check can be made to ensure that the proximity sensor remains in the false state for at least a predetermined period of time, to eliminate any false readings. At that point two events can occur in any order that result in the automatic answering of the call. First, in decision block 214, a check is made to determine whether a pitch and roll of the phone are within predetermined limits. Pitch and roll are terms well understood in the art and relate to the so-called Tait-Bryan angles in mathematics. They can be statically defined using a line of nodes constructed by the intersection of two non-homologous planes. Analysis can be performed to determine the limits that most user's experience when a phone is held to a user's ear. For example, limits for the minimum and maximum roll can be set between −3.0 and +3.0, while pitch can have a minimum value of 0.0 and a maximum value of 1.5. Again, these limits can be set to almost anything based on the particular design. If the pitch and roll are not within the predetermined limits, the method returns to decision block 214 to continually monitor the pitch and roll. Conversely, if the pitch and roll are within the predetermined limits, then a check is made in decision block 216 whether the proximity sensor is true, indicating that the phone is adjacent the user's ear. It may be desirable to determine if the pitch and roll are within the predetermined limits for a predetermined period of time or a percentage of time as the phone moves from a user's pocket to the user's ear, for example. Requirements can be set that if such periods or percentages are not met, then the phone is not automatically answered. In any event, a check can be made in decision block 216 to determine if the proximity sensor went from false to true indicating that the phone is now adjacent to the ear. If decision block 216 is answered in the negative, then the process returns to decision block 214. If decision block 216 is answered in the positive, then in decision block 218, the phone is automatically answered without user input. Thus, the user does not need to push any buttons to answer the phone and initiate the call. If the phone ringing is discontinued while in process block 212, 214, or 216, the method returns to process block 210. It should also be noted that process block 214 and 216 can be swapped. In sum, the proximity sensor goes through a progression of changing states at least three times to indicate moving from being positioned in a pocket, to moving towards a user's ear, to being placed adjacent a user's ear. Advantageously, this progression can be used to detect mobile phone position using a simple proximity sensor.

Figure 3:
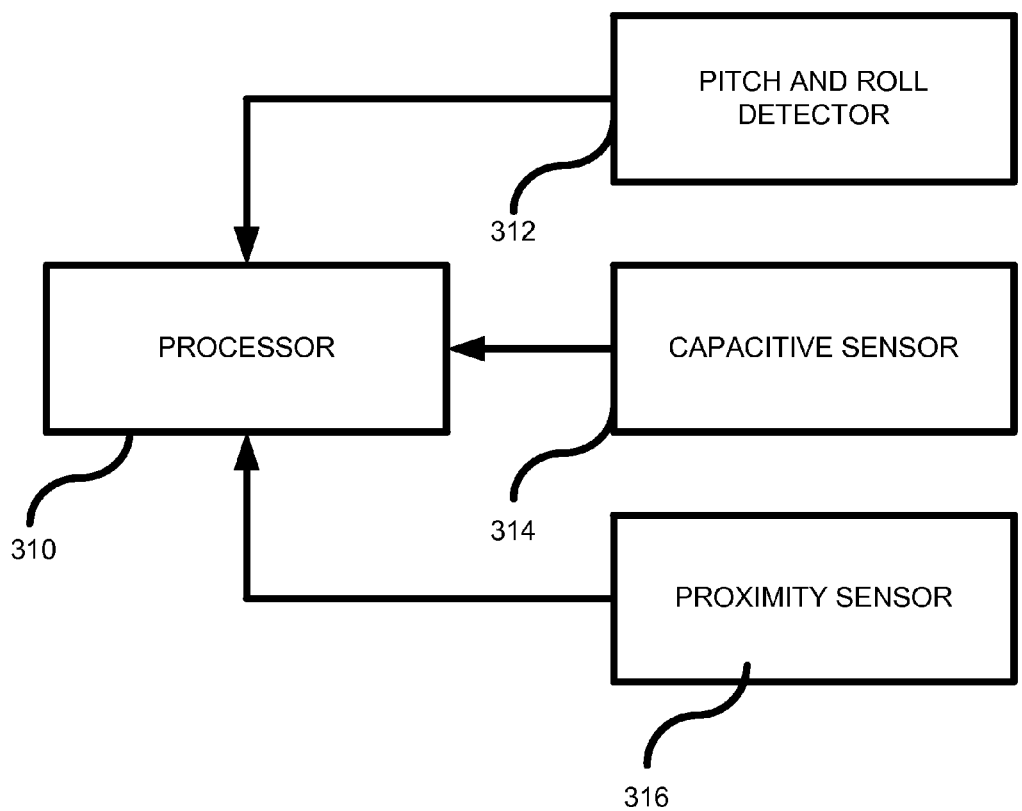
FIG. 3 is an example hardware diagram of additional features that can be used in the mobile phone.

FIG. 3 shows an embodiment of hardware that can be used. A processor 310 (or controller) is shown that can be the same processor 110 or a different processor. The processor 310 can provide the intelligence and an algorithmic flow to detect and check the different sensors and make determinations on whether conditions are appropriate for automatically answering the mobile phone. For example, the processor 310 is coupled to a pitch and roll detector 312, a capacitive sensor 314, and at least one proximity sensor 316. The pitch and roll detector can be accomplished using a variety of different techniques. For example, an accelerometer can be used to determine limits of the pitch and roll. The processor can track an amount or a percentage of time that the pitch and roll are within predetermined limits. In addition, or as an alternative, the pitch and roll detector can use a gyroscope. Alternatively, the pitch and roll detector can use both a gyroscope and an accelerometer. Thus, using output from the pitch and roll detector 312, the processor 310 can determine the pitch and roll of the mobile phone and any timing associated with changing of the pitch and roll. The capacitive sensor 314 can also take a variety of forms. For example, a capacitive strip can be placed on the outer casing of the phone so that when a human hand contacts the capacitive strip, a signal is sent to the processor. Alternatively, the capacitive touch screen on the phone can be placed in a mode that can detect when the phone is near human skin, such as near a person's face. The proximity sensor 316 is preferably an infrared sensor. Although only one proximity sensor is shown, there may be multiple proximity sensors located at appropriate positions on the phone.

Figure 4:
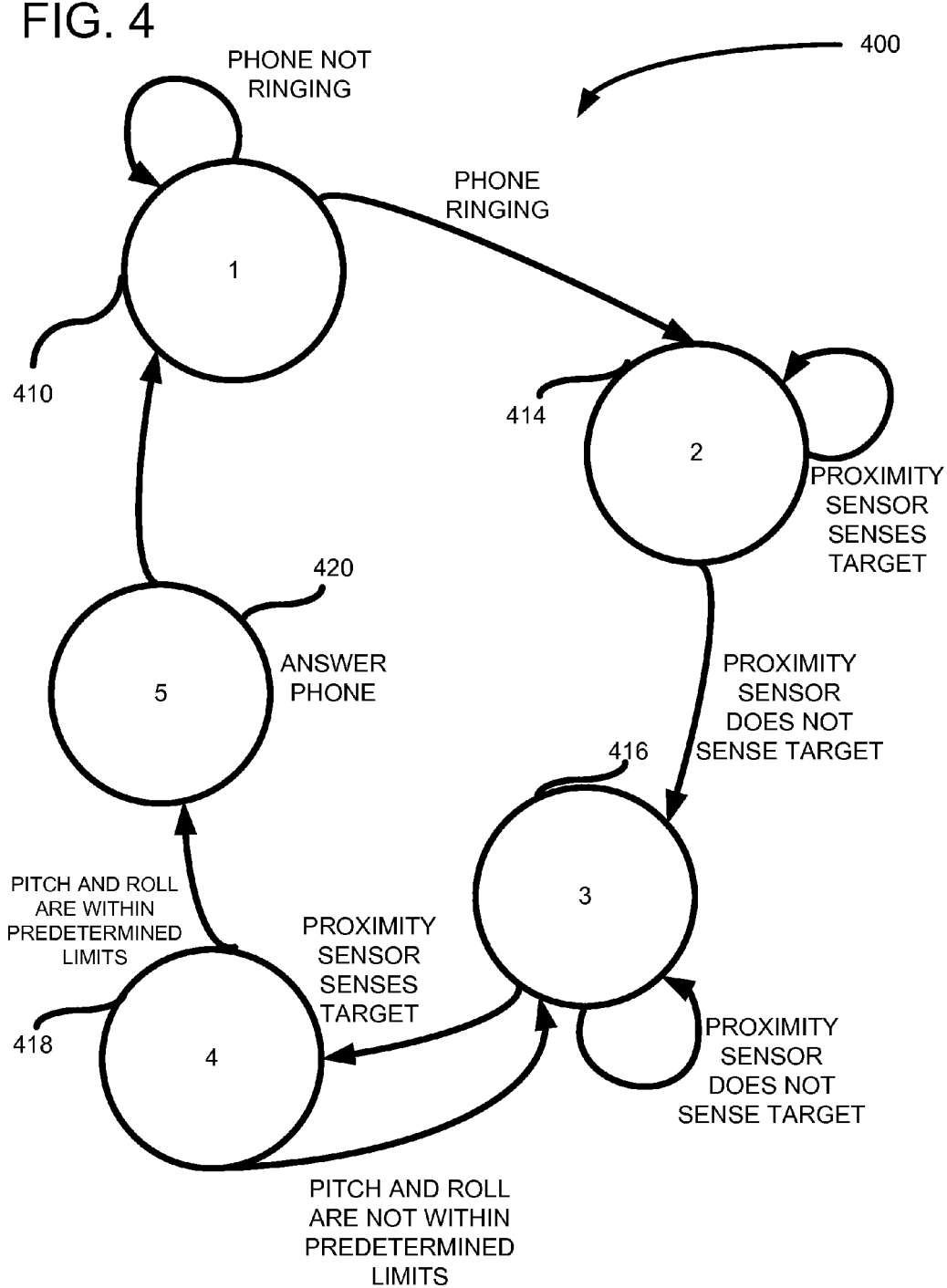
FIG. 4 is an exemplary state machine that can be implemented within the processor of FIG. 3.

FIG. 4 shows a state machine 400. The state machine begins in a state 1, shown at 410. In state 1, the state machine receives an input indicating whether the phone is ringing. If not, the state machine remains in state 1. If the phone is ringing, the state machine proceeds to state 2, shown at 414. In this state, the proximity sensor is read to determine if the phone is located in a user's pocket. Generally, if the proximity sensor detects the presence of a nearby object (e.g., the pocket), then it loops on state 2. Otherwise, if the proximity sensor does sense a target, it continues to state 3. In this way, the user removed the phone from a pocket or handbag and started moving the phone towards the user's ear. The state machine remains in state 3 while the proximity sensor does not sense a nearby object. If the proximity sensor senses a target, it transitions to state 4. In state 4, shown at 418, the state machine assumes that the mobile phone is adjacent the user's ear. In state 4, the pitch and roll detector detects and sends information to the processor 310 so that a determination or check can be made whether the pitch and roll are within predetermined limits. If not, the state machine returns to state 3. If so, the state machine transitions to state 5, shown at 420, where the phone is automatically answered. The state machine then transitions to state 1. Thus, both the proximity sensor and pitch and roll should simultaneously be true for the automatic answer to occur. It should also be realized that the pitch and roll and proximity computations can occur simultaneously. And when both computations are true, the call is answered. Additionally, if the phone stops ringing, the method aborts.

Figure 5:
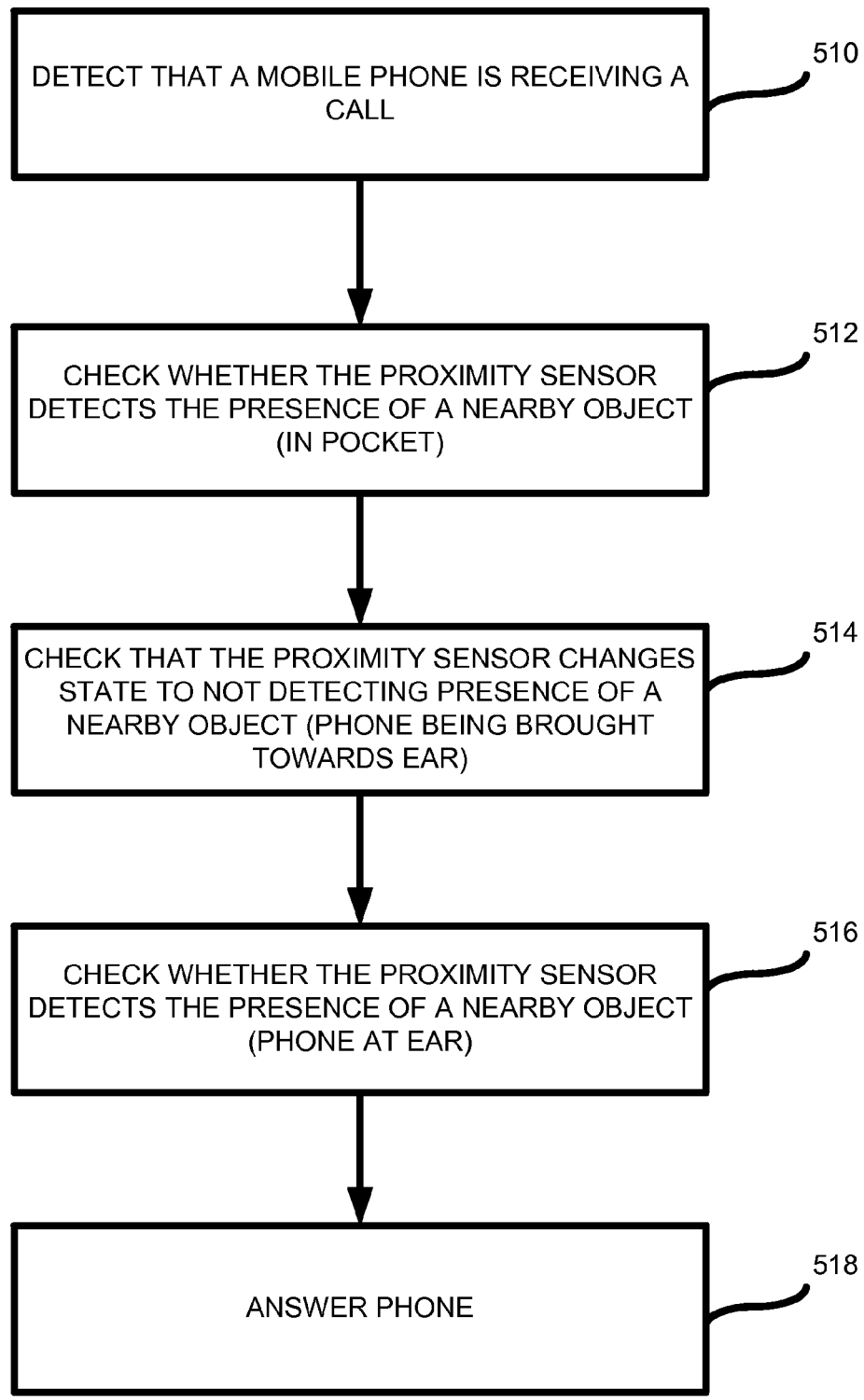
FIG. 5 is a flowchart of a method for automatically answering the mobile phone.

FIG. 5 shows a flowchart of another method for automatically answering the mobile phone. In process block 510, a detection is made that the mobile phone is receiving a call. In process block 512, a check is made whether the proximity sensor detects the presence of a nearby object, indicating the phone is in a user's pocket. In process block 514, a check is made to determine that the proximity sensor changed state indicating that the phone is moving towards an answering position. In process block 516, a check is made to determine if the proximity sensor detects the presence of a nearby object, indicating that the mobile phone is near a user's ear. In process block 518, the phone is automatically answered. The process blocks of FIG. 5 can be supplemented by using pitch and roll data and/or capacitive sensing, as already described. Alternatively, the process blocks of FIG. 5 can be supplemented by using a gyroscope to sense motion, instead of pitch and roll data.

Additional features can also be added to any of the embodiments described herein. For example, the pitch and roll limits can be dynamically modified based on a user's orientation. For example, a determination can be made whether a user is standing or lying. The predetermined pitch and roll limits can then be dynamically adjusted based on the determined orientation. Additionally, the pitch and roll limits can be set for right-handed or left-handed people. The limits can also be adjusted to allow for learning from usage to adjust and improve based on the unique characteristics of each user. Additionally, training can be used to adjust the predetermined limits.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A mobile device, comprising:
   a modem to detect that the mobile phone is receiving a call;
   a proximity sensor to detect a presence of a first object that is within a predetermined distance of the proximity sensor;
   if the proximity sensor detects the presence of the first object, a controller to check that the proximity sensor changes state to ensure that the first object is not within the predetermined distance of the proximity sensor;
   if the proximity sensor changes state to ensure that the first object is not within the predetermined distance of the proximity sensor, then the controller is to check whether the proximity sensor changes state to detecting another object, which is a second object, different than the first object; and
   if the proximity sensor changes state to detecting the second object, then the mobile device is to automatically answer the call, wherein the automatically answering of the call occurs when the proximity sensor goes through a progression of changing states at least three times including the detecting of the first object, then the not detecting of the first object, and then the detecting the second object.

2. The mobile device of claim 1, wherein after the proximity sensor changes state to not detecting the presence of the first object, the mobile device is to determine whether the pitch and roll of the mobile phone is within predetermined limits, and to only check whether the proximity sensor changes state to detecting the second object if the pitch and roll of the mobile phone is within the predetermined limits.

3. The mobile device of claim 2, wherein the pitch and roll is determined using an accelerometer.

4. The mobile device of claim 2, wherein the determining whether the pitch and roll is within the predetermined limits includes determining whether it is within the predetermined limits for a predetermined percentage of time.

5. The mobile device of claim 2, wherein the pitch and roll are determined using a gyroscope.

6. The mobile device of claim 2, wherein the mobile device is to dynamically modify the predetermined limits based on user orientation.

7. The mobile device of claim 2, wherein the mobile device is further to learn from usage and modify the predetermined limits based on characteristics of a user.

8. The mobile device of claim 2, wherein the mobile device is to adjust the predetermined limits.

9. The mobile device of claim 1, wherein the mobile device is to detect a user touch using a capacitive sensor and answering the call only if the user touch is detected.

10. The mobile device of claim 1, wherein the proximity sensor is an infrared sensor.

11. A mobile device, comprising:
    a processor coupled to a proximity sensor to detect, as a first check, a presence of a first object while a call is being received;
    if the proximity sensor detects the presence of the first object, the processor to use the proximity sensor to check, as a second check, a change of state to detecting that the first object is no longer present for at least a predetermined period of time;
    if the proximity sensor, as the second check, changes state to detecting that the first object is no longer present, then the processor to use the proximity sensor to check, as a third check, change to a state of detecting a second object; and
    the mobile device to automatically answer the call if the first, second, and third checks all occur during a process of answering the call on the mobile device.

12. The mobile device of claim 11, wherein after the proximity sensor changes state to not detecting the presence of the first object, the mobile device is to determine whether a pitch and roll of the phone is within predetermined limits, and only check whether the proximity sensor changes state to detecting the second object if the pitch and roll of the mobile device is within the predetermined limits.

13. The mobile device of claim 12, wherein the mobile device is to determine whether the pitch and roll of the phone are within predetermined limits and, wherein automatically answering the call occurs only if the pitch and roll are within the predetermined limits.

14. The mobile device of claim 12, wherein the pitch and roll are determined using an accelerometer.

15. The mobile device of claim 12, wherein the pitch and roll are determined using a gyroscope.

16. The mobile device of claim 12, wherein the mobile device is further to detect whether the pitch and roll are within the predetermined limits for a predetermined period of time.

17. The mobile device of claim 11, wherein the mobile device is further to detect a user touch using a capacitive sensor and answer the call only if the user touch is detected.

18. The mobile device of claim 11, wherein the proximity sensor is an infrared sensor.

19. A method for answering a mobile phone, comprising:
    detecting that the mobile phone is receiving an incoming call;
    detecting that the phone is in a pocket or handbag when the incoming call is received on the mobile phone using a proximity sensor;
    if the proximity sensor detects that the mobile phone is in the pocket or handbag, detecting using the proximity sensor, while the incoming call is still being received, that the mobile phone is no longer in the pocket or handbag indicating that a user has removed the mobile phone from the pocket or handbag so as to answer the mobile phone;
    in response to the detection that the mobile phone is no longer in the pocket or handbag, detecting that the mobile phone is within a predetermined distance to the user's ear while the incoming call is still being received indicating that the user desires to answer the mobile phone; and
    automatically answering the incoming call in response to the detection that the mobile phone is within the predetermined distance to the user's ear.

20. The method of claim 19, further including detecting, using a capacitive sensor, that the user is touching the mobile phone while the incoming call is still being received and answering the incoming call only if the user's touch is detected.

* * * * *